United States Patent
Abe et al.

(10) Patent No.: US 10,216,456 B2
(45) Date of Patent: *Feb. 26, 2019

(54) ESTIMATING MOUNT TIME COMPLETION IN FILE SYSTEMS

(71) Applicant: International Business Machines Corporation, Armonk, NY (US)

(72) Inventors: Atsushi Abe, Ebina (JP); Tohru Hasegawa, Tokyo (JP); Masayuki Iwanaga, Urayasu (JP); Yutaka Oishi, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 265 days.

This patent is subject to a terminal disclaimer.

(21) Appl. No.: 15/217,156

(22) Filed: Jul. 22, 2016

(65) Prior Publication Data

US 2018/0025015 A1    Jan. 25, 2018

(51) Int. Cl.
*G06F 17/30* (2006.01)
*G06F 3/06* (2006.01)

(52) U.S. Cl.
CPC .......... *G06F 3/0682* (2013.01); *G06F 3/0617* (2013.01); *G06F 3/0643* (2013.01)

(58) Field of Classification Search
CPC .... G06F 3/0682; G06F 3/0617; G06F 3/0643; G06F 17/30312
See application file for complete search history.

(56) References Cited

U.S. PATENT DOCUMENTS

| 9,141,542 | B1 | 9/2015 | Justiss et al. |
| 9,256,370 | B2 | 2/2016 | Hasegawa et al. |
| 2011/0145494 | A1* | 6/2011 | Mitsuma ................. G06F 3/061 711/111 |
| 2011/0302189 | A1* | 12/2011 | Liu ................... G06F 17/30929 707/769 |
| 2015/0127616 | A1* | 5/2015 | Hasegawa ......... G06F 17/30188 707/661 |

(Continued)

FOREIGN PATENT DOCUMENTS

| JP | 20152015788 A | 12/2015 |
| JP | 2016021100 A | 2/2016 |

OTHER PUBLICATIONS

"HPE StoreOpen and LTFS", Best practices, Hewlett Packard Enterprise, Technical white paper, Dec. 2015, © Copyright 2014-2015 Hewlett Packard Enterprise Development LP, 25 pages.

*Primary Examiner* — Cam Y T Truong
(74) *Attorney, Agent, or Firm* — Alexa L. Ashworth; Brian M. Restauro

(57) ABSTRACT

Embodiments of the present invention provide methods, systems, and computer program products for estimating mount time completion in file systems. In an embodiment, at a time of unmounting storage media, an index file is provided, which records information stored in the storage media. Information associated with a number of tags of the index file, the types of contents of the tags, and a size of the contents of an element are stored, in response to an unmounting operation of the storage media. A predicted time associated with loading the index file into the memory during a mounting operation of the storage media is calculated, based on the stored information.

17 Claims, 5 Drawing Sheets

(56) References Cited

U.S. PATENT DOCUMENTS

2015/0235028 A1* 8/2015 Tsuchitoi ............... G06F 21/572
713/187
2015/0347022 A1* 12/2015 Ashida .................. G06F 3/0607
711/113

* cited by examiner

ESTIMATING MOUNT TIME COMPLETION IN FILE SYSTEMS

BACKGROUND OF THE INVENTION

The present invention relates generally to the field of data storage systems, and more particularly to estimating mount time completion in file systems, such that the remaining time to complete the mounting operation is presented to the user so as to prevent an erroneous determination of a system abnormality.

The Linear Tape File System (LTFS) is software which works with hardware resources to enable tape medium to be accessed via a file system interface. LTFS is implemented by storing data on tape medium using the LTFS format, which has open specifications, and has been adopted by many companies.

Media libraries are implemented with the LTFS, which contain multiple tape media and tape drives. Each tape drive in a tape library is shared by a plurality of tape media, where a tape media is inserted (i.e., mounted) into a tape drive when a need for accessing data from a particular tape medium arises, and the tape media is ejected (i.e., unmounted from the tape drive) when accessing data from that tape media becomes unnecessary or has ended.

SUMMARY

Embodiments of the present invention provide methods, systems, and computer program products for estimating mount time completion in file systems. In one embodiment, one or more computer processors, at a time of unmounting storage media, provide an index file, wherein the index file records information stored in the storage media. One or more computer processors store information associated with a number of tags of the index file, a type of contents of the tags, and a size of contents of an element, in response to unmounting the storage media. One or more computer processors calculate, based on the stored information, a predicted time associated with loading the index file into a memory during a mounting operation of the storage media.

DETAILED DESCRIPTION

Figure 1:
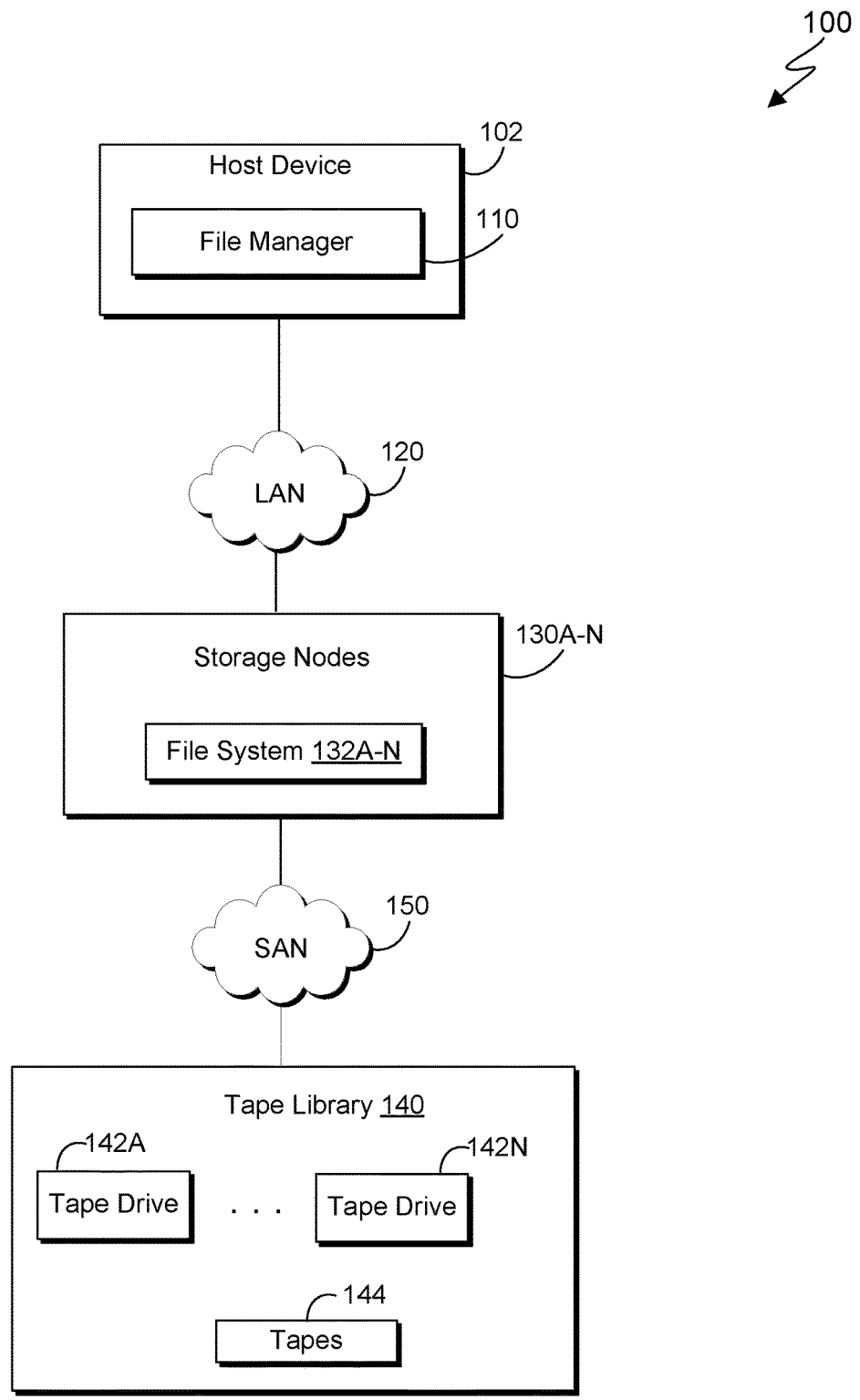
FIG. 1 depicts a functional block diagram of a file storage system, in accordance with an embodiment of the present invention.

The LTFS is software that enables access to a tape via an interface of a file system. An LTFS system is used by storing data in a tape medium with a format compliant with the LTFS format, which is an open standard. As the LTFS format is an open standard and the implementation thereof has been made by many vendors, LTFS is not only used inside one single company, but can be used for the exchange of files between many companies. For example, in the case of exchange of video materials in the broadcasting industry, where a large amount of files are exchanged, data is exchanged using tape cartridges written in accordance with the LTFS format, among a company that captures video images, a company that edits the captured video images, a company that broadcasts the edited video images, and other relevant companies.

According to the LTFS format, information regarding all files and directories stored in the tape medium (e.g., directory name, file name, file size, time stamp, and location of data on a tape cartridge) is to be recorded as one single file with the eXtensible Markup Language (XML) format. For purposes of the present disclosure, the file with the XML format is referred to as the index file. In order to mount a tape medium in the LTFS system, making the tape medium accessible as a file system, it is necessary to read the index file from the beginning of the index partition, and parse the index file. The time required to parse the index file and load it into the memory is dependent on the number of tags, the type of the content, and the size of the content of the element (i.e., start tag+content+end tag). In this way, the time required after starting, and until completion of a mounting operation of the tape medium depends on the number of tags described in the index file and the types and sizes of the content. In general, there is no way to know about these factors, even when the file system is in use. As a result, when mounting of the tape has been started, but not completed, for a certain period of time, it cannot be determined whether this is caused by, for example, a large number of tags, or the large size of the content described in the index file, or due to an occurrence of an abnormality in the system, which is preventing completion of the mounting.

With respect to mounting operations, as a typical example, when the mounting is not completed after two to three minutes after starting the mounting operation, the system may be restarted on the assumption that this is caused by the system abnormality and reported to the developer of the file system as a failure, when in fact, it may be caused by a larger than normal number of tags, for example.

Embodiments of the present invention recognize that file systems may erroneously determine a system abnormality when mounting of a tape medium takes a longer time than normal, due to a large number of tags in the index file stored in the tape or to the large size of content, for example. Embodiments of the present invention provide systems and methods for estimating a mount time completion for mounting a tape medium in order to help prevent erroneous determination of a system abnormality when the mounting of a tape medium takes time due to the large number of tags in the index file or due to the large size of the content. Embodiments of the present invention extend the mounting and unmounting operations of an existing LTFS system, so that when a tape medium is unmounted in an LTFS system, information regarding the number of tags and the content of the index file is stored on the tape medium. At the time of the mounting operation of the tape medium, the stored information is read prior to reading the index file, and information regarding the remaining time to complete the mounting operation is presented to the user so as to prevent erroneous determination of a system abnormality.

The present invention will now be described in detail with reference to the Figures. FIG. 1 depicts a functional block diagram illustrating a file storage system, generally designated 100, in accordance with an embodiment of the present invention. Modifications to file storage system 100 may be made by those skilled in the art without departing from the scope of the invention as recited by the claims. In an exemplary embodiment, file storage system 100 includes host device 102, local area network (LAN) 120, and storage nodes 130A-N, connected to tape library 140 through storage area network (SAN) 150.

Host device 102 may be a computing device, such as a laptop computer, a tablet computer, a netbook computer, a personal computer (PC), a desktop computer, a personal digital assistant (PDA), a smart phone, a thin client, or any programmable electronic device capable of communicating with tape library 140. In other embodiments, host device 102 may be a management server, a web server, or any other electronic device or computing system capable of receiving and sending data. Host device 102 may include internal and external hardware components, as depicted and described in further detail with respect to FIG. 4. Host device 102 includes file manager 110.

File manager 110 is a software tool that enables access to a tape via an interface (not pictured) of the file system (i.e., file system 132A-N). File manager 110 can communicate with tape drives 142A-N and tapes 144 over a local area network (LAN) 120, using a network protocol, such as CIFS or NFS, to control the mounting and unmounting operations of tapes 144 and tape drives 142A-N. In this exemplary embodiment, LAN 120 is an Ethernet connection, to connect file system 132A-N to file manager 110. In other embodiments, file manager 110 and file system 132A-N are located on the same computing device.

A file system component, file system 132A-N, is designed to work with file storage system 100, and is installed on each instance of storage nodes 130A-N. File system 132A-N tracks the status of files stored in tape library 140 by file storage system 100 and accesses the recording space on tapes 144 through its file system interface, and handles the user data as file objects and associated metadata. In some embodiments, file system 132A-N can be a linear tape file system (LTFS). In a preferred embodiment, file system 132A-N can be accessed by file manager 110, via a network protocol, such as CIFS.

Tape library 140 includes tape drives 142A-N and tapes 144. Tape drives 142A-N can be any number of tape drives. Both tape library 140 and each of the tape drives 142A-N may comprise firmware of a processor, and a memory which is coupled to the processors, comprising instructions that, when executed by the processor, cause the process to perform various operations. Storage nodes 130A-N can communicate with tape library 140 through a network, such as storage area network (SAN) 150.

Tapes 144 can include one or more sequential access media, such as magnetic tape in tape drives 142A-N, optical media, and/or other storage device media.

According to the LTFS format, information regarding all files and directories stored in the tape medium (e.g., directory name, file name, file size, time stamp, and location of data on the tape cartridge) is to be recorded as one single file with the XML format (i.e., the index file). In order to mount a tape medium in the LTFS system, making the tape medium accessible as a file system, it is necessary to read the index file from the beginning of the index partition, and parse the index file. For each file and directory, file name, file size, time stamp, extended attribute, the location on the tape, and the like are described as the content of the element (i.e., start tag+content+end tag). In order to parse the index file and load the index file into memory, areas corresponding to the respective tags are assigned in the memory and the described content is stored therein. Therefore, the time required to parse the index file and load the index file into the memory depends on: (1) the number of tags; (2) the type of the content; and (3) the size of the content. The time required to read the XML tags increases in proportion to the number of tags (i.e., the greater the number of tags, the more time required to read the XML tags). The larger the size of the content, the more time that is required to ensure the memory area and copy the content. The time required to interpret the content varies according to the types of the content. For example, in the case of C-Language based LTFS implementations, the content is stored in a time_t type parameter (i.e., the content of the Content is interpreted and the fact that the tag is associated with the date is recognized, and then the content is loaded into memory).

While the time required after starting, and until completion of the mounting operation of the cartridge is dependent on the number of tags described in the index file, the types of content, and the size of the content, there is generally no way to know these factors while a file system is in use. As a result, when mounting of the tape medium has been started, but not completed, for a certain period of time, it cannot be determined whether this is caused by the large number of tags, the large size of the content described in the index file, or due to the occurrence of abnormality in the system that prevents the completion of the mounting operation.

Figure 2:
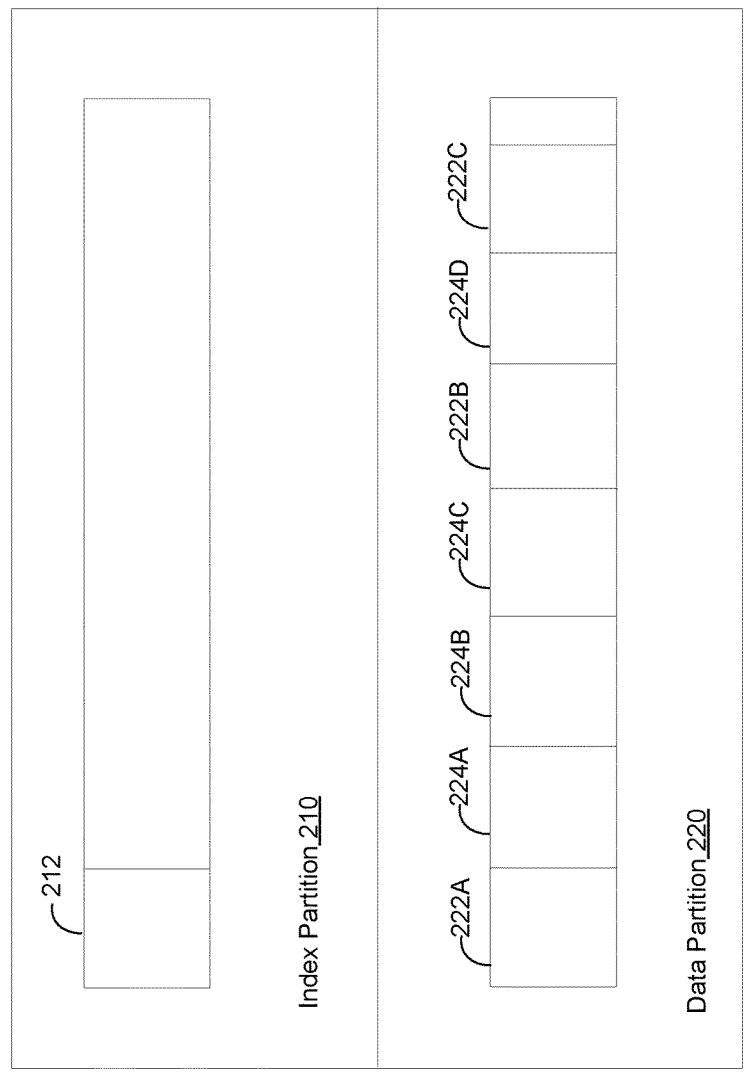
FIG. 2 depicts an example block diagram of a data storage medium, in accordance with an embodiment of the present invention.

FIG. 2 depicts an example block diagram of a data storage medium 200 in accordance with an embodiment of the present invention. The depicted data storage medium 200 is representative of a conventional LTFS tape medium, and includes index partition 210 and data partition 220.

Index partition 210 is configured to record meta information, such as the file allocation information, and data partition 220 is configured to record the body of the data. As the file allocation information is frequently updated and the tape is a sequential medium, when data is recorded in one single partition, then the allocation information (i.e., meta information field 222) is recorded to the end of the sequence of data in the partition (i.e., data partition 220), as it is updated. The depicted example includes three meta information fields 222A, 222B, and 222C. The endmost information is read when a tape medium is to be mounted, which extends the time required to mount the tape medium. To eliminate the need to access the end of the data partition 220 during mounting operations, meta information is recorded at the end of the sequence of data on the data partition and also it is overwritten and recorded to the beginning portion of the index partition in response to unmounting of a tape medium. Accordingly, with the depicted data storage medium 200, meta information can be read from the index partition in response to mounting of the tape medium.

For example, as depicted in FIG. 2, the latest meta information (meta information field 222C) are recorded in index partition 210 (depicted as meta information 212). Meta information (i.e., meta information fields 222A, 222B, and 222C) is also recorded in data partition 220, in addition to the data (i.e., files 224A, 224B, 224C, and 224D). In this example, meta information field 222A and 222B are old meta information, stored therein on the tape medium, without being rewritten.

Figure 3A:
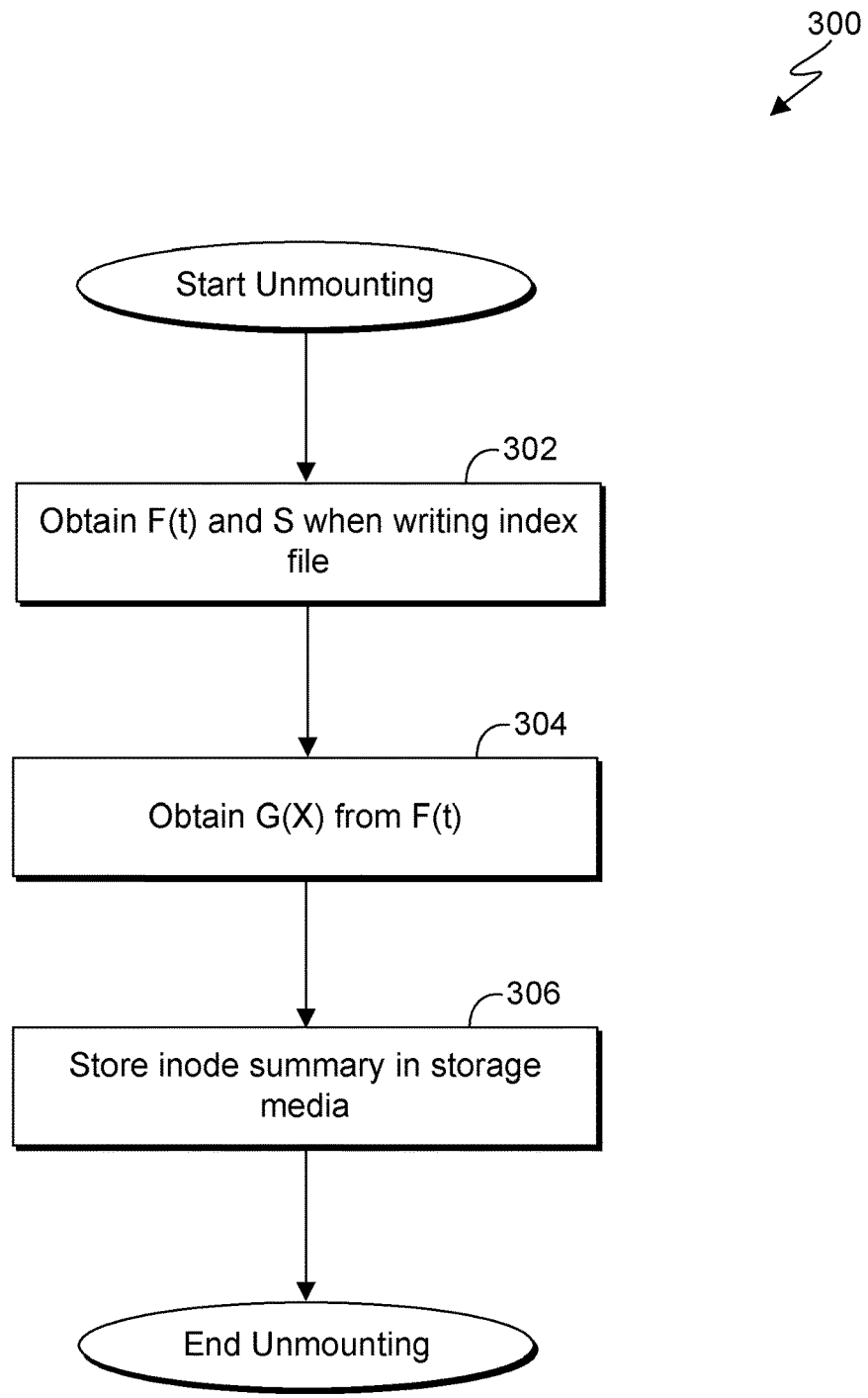
FIG. 3A depicts a flowchart illustrating operations for obtaining and storing an inode summary at the time of unmounting a tape medium, in accordance with an embodiment of the present invention.

FIG. 3A depicts a flowchart 300 illustrating operations for obtaining and storing an inode summary at the time of unmounting a tape medium, in accordance with an embodiment of the present invention.

File system 132A-N starts an unmounting process. When a tape medium is unmounted in an LTFS system, information regarding the number of tags and the content of the index file is stored on the tape medium. Information regarding the number of tags and the size of the content of the index file stored at the time of the unmounting operation is called an inode summary. In this exemplary embodiment, the inode summary is obtained using the operations described below, with regards to FIG. 3.

File system 132A-N obtains F(t) and S when writing the index file (operation 302). In this exemplary embodiment, S represents the total number of tags and F(t) is a function that corresponds to a t-th tag of the index file, and is defined as follows:

If t=1, then F(t)=W(t)
If t>1, then F(t)=F(t−1)+W(t), where W(t) is defined in accordance with the length of time required for each tag when parsing the index file and loading it into memory at the time of the mounting operation. W(t) can depend on the implementation of the parsing operation and the operation of loading the memory performed at the time of the mounting operation of the LTFS system. For example, the correspondence between tags and W(t) can be defined in accordance with the following Table 1.

TABLE 1

| Tag Name | Value of W(t) |
| --- | --- |
| Name | (The number of bytes of content) × 2 |
| Length | 5 |
| Creation_time | 20 |
| Change_time | 20 |
| Modify_time | 20 |
| Access_time | 20 |
| Backup_time | 20 |
| File_uid | 2 |
| Key | (The number of bytes of content) × 2 |
| Value | (The number of bytes of content) × 2 |
| File_offset | 2 |
| Partition | 2 |
| Start_block | 2 |
| Byte_offset | 2 |
| Byte_count | 2 |
| Others | 1 |

The value of W(t) may be held in a fixed or static manner, or may be calculated on the basis of actual values in the actual environment. For example, the length of time used to process each tag in the course of the actual use of the LTFS system can be measured, and the average value of the measured lengths of time is used.

File system 132A-N obtains G(X) from F(t) (operation 304). In this exemplary embodiment, the value of F(t) represents the time required from the start of the mounting operation, until the completion of processing of the t-th tag, and F(t) can be approximated as the following n-degree polynomial expression:

$$G(X)=a_n x^n + a_{n-1} x^{n-1} + \ldots + a_1 x + a_0$$

where the maximum degree (n), the coefficients ($a_x$, ..., $a_0$), and the total number of tags (S) are combined to form one inode summary, where Inode summary={n, ($a_x$, ..., $a_0$), S}.

File system 132A-N stores the inode summary in a storage media (operation 306). In this exemplary embodiment, file system 132A-N stores the inode summary in the tape medium when the tape medium is unmounted. The inode summary may be stored in the index partition of the tape medium, so as to reside prior to, or after, the index file. In other embodiments, when the inode summary is carried by the vendor-specific area of the Cartridge Memory (CM), which is a non-volatile memory device of the tape medium, the inode summary can be stored in conformance with the LTFS format.

Figure 3B:
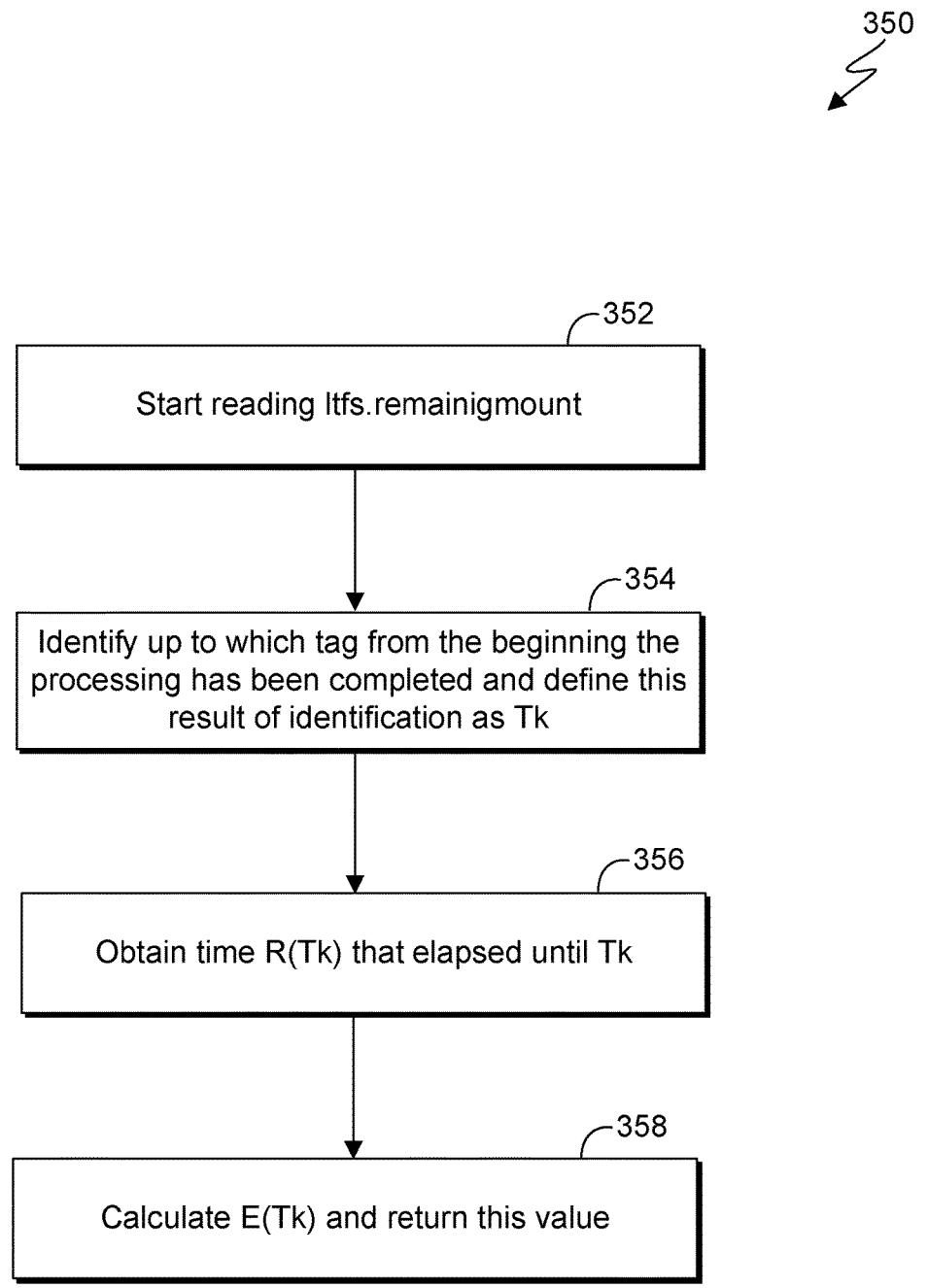
FIG. 3B depicts a flowchart illustrating operations for predicting the remaining time to load tags in response to an access request, in accordance with an embodiment of the present invention.

FIG. 3B depicts a flowchart 350 illustrating operations for predicting the remaining time to load tags in response to an access request, in accordance with an embodiment of the present invention. At the time of a mounting operation of the tape medium, the inode summary stored in accordance with the operations of FIG. 3A is read from the tape medium and the polynomial expression function G(X) is obtained.

A dialog application starts reading ltfs.remainigmount, via file manager 110 (operation 352).

File system 132A-N identifies up to which tag from the beginning the processing has been completed and defines this result of identification as Tk (operation 354). In this exemplary embodiment, the time from the start of the mounting operation until the completion of the loading of the tags into the memory, up to the tag Tk can be estimated as G(Tk).

File system 132A-N obtains time R(Tk) that elapsed until Tk (operation 356). In this exemplary embodiment, the actual time used to load the tags, up to the Tk tag, into the memory is expressed as R(Tk).

File system 132A-N calculates E(Tk) and returns the value (operation 358). In this exemplary embodiment, using the above calculated times, the predicted time, E(Tk) needed for the remaining mounting operation can be expressed as:

$$E(Tk)=(G(S)/G(Tk))\times R(Tk).$$

The LTFS system is extended so that the actual time used after the start of the mounting operation up to the loading of each tag into the memory is measured, and thus the value E(Tk) is calculated and presented to a user. In some embodiments, the value of E(Tk) is presented to the user using a dialog that is displayed during the mounting operation, to indicate the remaining time or the value E(Tk) can be obtained at any time by the user during the as the Extended Attribute (i.e., value for an attribute name "ltfs.remainigmount") of the root directory. The dialog may be implemented such that the dialog application obtains and displays the remaining time from the Extended Attribute of the root directory of the LTFS system.

Accordingly, when an access to the Extended Attribute has occurred, the predicted remaining time to complete the mounting operation can be calculated and presented to the user, in order to provide the user with an approximate time to completion, thus helping to eliminate erroneous determinations of a system abnormality when the mounting of the tape medium takes additional time, due to, for example, a large number of tags in the index file or a large size of the content.

In some embodiments, depending on the states of the CPU and the memory of the environment executing the LTFS system, the mounting and unmounting operations may take longer, as more resources (e.g., CPU and memory) may be required to obtain F(t) and G(x) at the time of the unmounting operation and to calculate G(Tk) at the time of the mounting operation. In this case, for example, the mode summary is:

Inode summary={0, 1, S}, if W(t) is always equal to 1, regardless of the types of the tags and the maximum degree, n, of G(x) is n=0. According to this implementation, only the number of tags, S, needs to be calculated to obtain F(t) and G(x). In this case, the currently implemented LTFS system stores the index file as a file in the XML format, and there is no significant impact on the CPU or memory, as long as only the number of tags (S) needs to be calculated, in addition to the currently executed relevant operations. As this may decrease the accuracy of the estimated time needed to complete the mounting operation, the values of W(t) and n can be defined by taking into account the correlation between the states of CPU and memory of the execution environment, and the estimation accuracy. As the environment of CPUs and memory units of computing devices are improved over time, such that they have the capability to handle a large value of n, the prediction accuracy of the remaining time of the mounting operation can be increased, by increasing the value of n.

Figure 4:
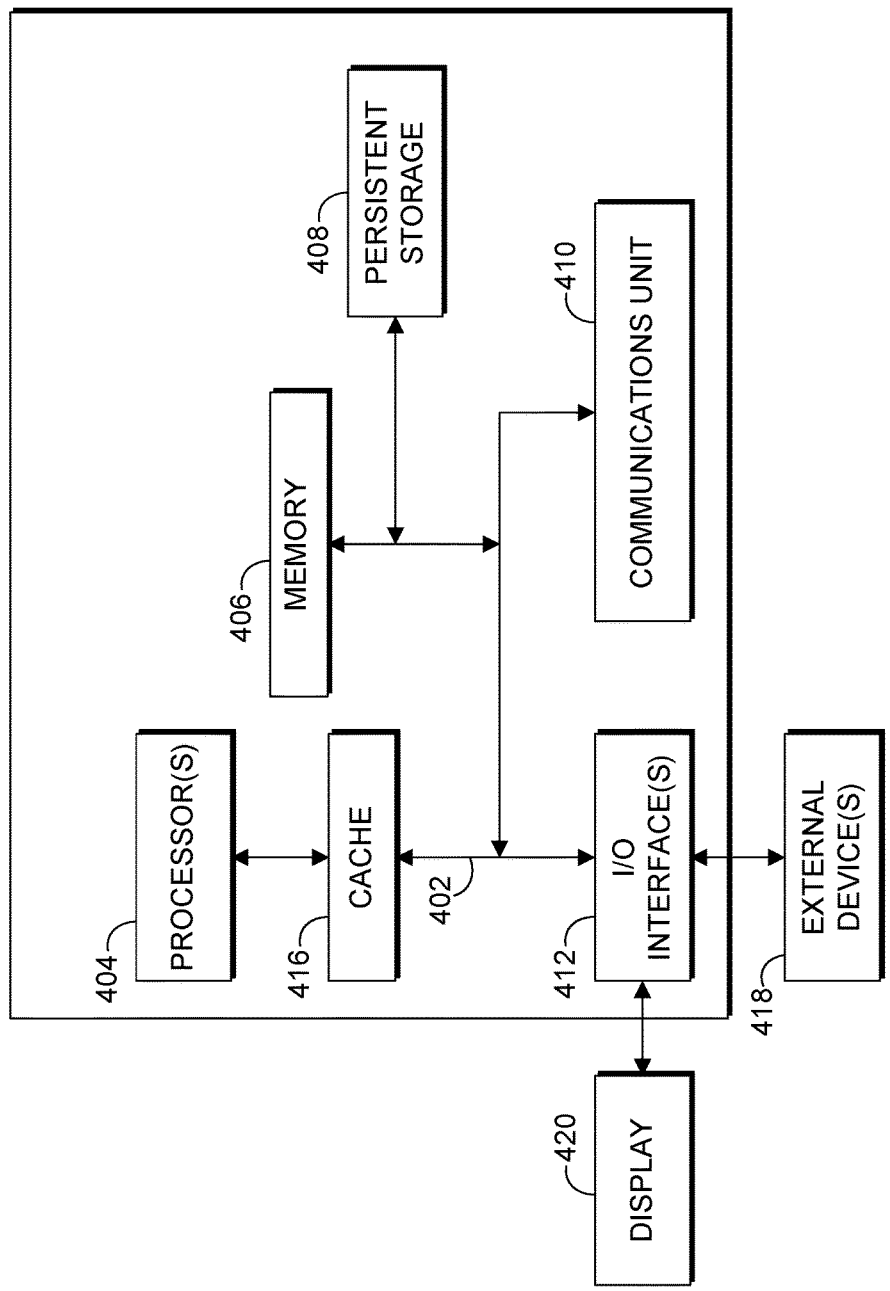
FIG. 4 depicts a block diagram of components of a computing device, in accordance with an illustrative embodiment of the present invention.

FIG. 4 is a block diagram of internal and external components of a computing device, generally designated 400, which is representative of the computing devices of FIG. 1, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Computing device 400 includes communications fabric 402, which provides communications between computer processor(s) 404, memory 406, cache 416, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM). In general, memory 406 can include any suitable volatile or non-volatile computer readable storage media. Cache 416 is a fast memory that enhances the performance of processors 404 by holding recently accessed data, and data near recently accessed data, from memory 406.

Program instructions and data used to practice embodiments of the present invention may be stored in persistent storage 408 and in memory 406 for execution by one or more of the respective processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of a network. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to computing device 400. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention (e.g., software and data) can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
at a time of unmounting a storage media, providing an index file, wherein the index file records information stored in the storage media;
storing, by one or more computer processors, information associated with a number of tags of the index file, a type of contents of the tags, and a size of contents of an element, in response to unmounting the storage media, wherein storing the information, comprises:
obtaining a function F(t) corresponding to a tag of the index file in accordance with a set of procedures:
F(t)=W(t) when t=1; and
F(t)=F(t−1)+W(t) when t>1,
where function W(t) is defined based on a length of time required for each tag when parsing the index file and loading the index file into the memory during the mounting operation, and
calculating the information based on the function F(t); and
calculating, by the one or more computer processors, based on the stored information, a predicted time associated with loading the index file into a memory during a mounting operation of the storage media.

2. The method of claim 1, wherein a value of the function W(t) is calculated based on an average value of measured lengths of time required for processing of each tag.

3. The method of claim 1, wherein storing the information, further comprises:
approximating the function F(x) using a polynomial expression G(x):

$$G(X)=a_n x^n + a_{n-1} x^{n-1} + \ldots + a_1 x + a_0; \text{ and}$$

storing an inode summary in the storage media at the time of unmounting the storage media, wherein the inode summary comprises: a maximum degree (n), a coefficient ($a_x, \ldots, a_0$), and the total number of tags (S), of the polynomial expression G(x).

4. The method of claim 3, wherein calculating the predicted time comprises:
calculating, by the one or more processors, a period of time G(S), from a start of the mounting operation until a completion of the loading of the total number of tags (S) into the memory.

5. The method of claim 4, wherein calculating the predicted time comprises:
obtaining an estimated time E(Tk), wherein the estimated time E(Tk) is a time required for loading of the tags into the memory, up to tag Tk, in accordance with the following procedure:

$$E(Tk)=(G(S)/G(Tk))\times R(Tk),$$

where R(Tk) is an actual time that elapsed to load the tags, up to the tag Tk, into the memory.

6. The method of claim 1, wherein the stored information is stored in: an index partition of the storage media or a vendor-specific area of a Cartridge Memory (CM) of a tape cartridge.

7. A computer program product comprising:
one or more computer readable storage media and program instructions stored on the one or more computer readable storage media, the program instructions comprising:
program instructions to, at a time of unmounting a storage media, provide an index file, wherein the index file records information stored in the storage media;
program instructions to store information associated with a number of tags of the index file, a type of contents of the tags, and a size of contents of an element, in response to unmounting the storage media, wherein the program instructions to store the information comprise:
program instructions to obtain a function F(t) corresponding to a tag of the index file in accordance with a set of procedures:
F(t)=W(t) when t=1; and
F(t)=F(t−1)+W(t) when t>1,
where function W(t) is defined based on a length of time required for each tag when parsing the index file and loading the index file into the memory during the mounting operation, and
program instructions to calculate the information based on the function F(t); and
program instructions to calculate, based on the stored information, a predicted time associated with loading the index file into a memory during a mounting operation of the storage media.

8. The computer program product of claim 7, wherein a value of the function W(t) is calculated based on an average value of measured lengths of time required for processing of each tag.

9. The computer program product of claim 7, wherein the program instructions to store the information, further comprise:
program instructions to approximate the function F(x) using a polynomial expression G(x):

$$G(X)=a_n x^n + a_{n-1} x^{n-1} + \ldots + a_1 x + a_0; \text{ and}$$

program instructions to store an inode summary in the storage media at the time of unmounting the storage media, wherein the inode summary comprises: a maximum degree (n), a coefficient ($a_x, \ldots, a_0$), and the total number of tags (S), of the polynomial expression G(x).

10. The computer program product of claim 9, wherein the program instructions to calculate the predicted time comprise:
program instructions to calculate a period of time G(S), from a start of the mounting operation until a completion of the loading of the total number of tags (S) into the memory.

11. The computer program product of claim 10, wherein the program instructions to calculate the predicted time comprise:
program instructions to obtain an estimated time E(Tk), wherein the estimated time E(Tk) is a time required for loading of the tags into the memory, up to tag Tk, in accordance with the following procedure:

$$E(Tk)=(G(S)/G(Tk))\times R(Tk),$$

where R(Tk) is an actual time that elapsed to load the tags, up to the tag Tk, into the memory.

12. The computer program product of claim 7, wherein the stored information is stored in: an index partition of the storage media or a vendor-specific area of a Cartridge Memory (CM) of a tape cartridge.

13. A computer system comprising:
one or more computer processors;
one or more computer readable storage media;
program instructions stored on the computer readable storage media for execution by at least one of the one or more processors, the program instructions comprising:
program instructions to, at a time of unmounting a storage media, provide an index file, wherein the index file records information stored in the storage media, wherein the program instructions to store the information comprise:
program instructions to obtain a function F(t) corresponding to a tag of the index file in accordance with a set of procedures:
F(t)=W(t) when t=1; and
F(t)=F(t−1)+W(t) when t>1,
where function W(t) is defined based on a length of time required for each tag when parsing the index file and loading the index file into the memory during the mounting operation, and
program instructions to calculate the information based on the function F(t);
program instructions to store information associated with a number of tags of the index file, a type of contents of the tags, and a size of contents of an element, in response to unmounting the storage media; and
program instructions to calculate, based on the stored information, a predicted time associated with loading the index file into a memory during a mounting operation of the storage media.

14. The computer system of claim 13, wherein a value of the function W(t) is calculated based on an average value of measured lengths of time required for processing of each tag.

15. The computer system of claim 13, wherein the program instructions to store the information, further comprise:
program instructions to approximate the function F(x) using a polynomial expression G(x):

$$G(X)=a_n x^n + a_{n-1} x^{n-1} + \ldots + a_1 x + a_0; \text{ and}$$

program instructions to store an inode summary in the storage media at the time of unmounting the storage media, wherein the inode summary comprises: a maximum degree (n), a coefficient ($a_x, \ldots, a_0$), and the total number of tags (S), of the polynomial expression G(x).

16. The computer system of claim 15, wherein the program instructions to calculate the predicted time comprise:

program instructions to calculate a period of time G(S), from a start of the mounting operation until a completion of the loading of the total number of tags (S) into the memory.

17. The computer system of claim 15, wherein the program instructions to calculate the predicted time comprise:

program instructions to obtain an estimated time E(Tk), wherein the estimated time E(Tk) is a time required for loading of the tags into the memory, up to tag Tk, in accordance with the following procedure:

$$E(Tk)=(G(S)/G(Tk))\times R(Tk),$$

where R(Tk) is an actual time that elapsed to load the tags, up to the tag Tk, into the memory.

* * * * *